(12) United States Patent
Onuma et al.

(10) Patent No.: US 11,496,652 B2
(45) Date of Patent: Nov. 8, 2022

(54) ELECTRONIC APPARATUS, METHOD FOR CONTROLLING SAME, AND COMPUTER READABLE MEDIUM

(71) Applicant: CANON KABUSHIKI KAISHA, Tokyo (JP)

(72) Inventors: Hidetoshi Onuma, Tokyo (JP); Koichi Gunji, Yokohama (JP); Yasushi Ito, Yokohama (JP); Manabu Umeyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 17/061,812

(22) Filed: Oct. 2, 2020

(65) Prior Publication Data

US 2021/0105383 A1  Apr. 8, 2021

(30) Foreign Application Priority Data

Oct. 4, 2019 (JP) .............................. JP2019-184078

(51) Int. Cl.
*H04N 5/06* (2006.01)
*H04N 5/232* (2006.01)

(52) U.S. Cl.
CPC ........... *H04N 5/06* (2013.01); *H04N 5/23212* (2013.01); *H04N 5/23216* (2013.01); *H04N 5/23293* (2013.01)

(58) Field of Classification Search
CPC ...... H04N 5/232; H04N 5/06; H04N 5/23212; H04N 5/23216; H04N 5/23293; G02B 7/28; G03B 13/36; G03B 17/18; G06F 13/42; G09G 3/20
See application file for complete search history.

(56) References Cited

U.S. PATENT DOCUMENTS

2008/0079817 A1*  4/2008  Murata ............. H04N 5/23245
                                                    348/222.1
2016/0261815 A1*  9/2016  Shiohara ................ H04N 5/369

FOREIGN PATENT DOCUMENTS

JP   2006-157151 A   6/2006
JP   2007-019583 A   1/2007
JP   2007-096456 A   4/2007

* cited by examiner

*Primary Examiner* — John W Miller
*Assistant Examiner* — Omer Khalid
(74) *Attorney, Agent, or Firm* — Cowan, Liebowitz & Latman, P.C.

(57) ABSTRACT

An electronic apparatus provided with a display unit configured to display image data, comprises a synchronization control unit that generates a synchronization signal based on a display rate of the display unit, and an image processing unit that operates in accordance with an operating clock and execute image processing on image data to be displayed on the display unit at a display rate synchronized with the synchronization signal. The operating clock is not changed when the synchronization control unit changes a period of the synchronization signal in accordance with a change in a display rate of the display unit.

17 Claims, 8 Drawing Sheets

DISPLAY 30 FRAMES/SECOND

DISPLAY 60 FRAMES/SECOND

DISPLAY 120 FIELDS/SECOND

SENSOR, DEVELOPMENT, AND DISPLAY 30 FRAMES/SECOND

SENSOR, DEVELOPMENT, AND DISPLAY 60 FRAMES/SECOND

SENSOR AND DEVELOPMENT 120 FRAMES/SECOND
DISPLAY 120 FIELDS/SECOND

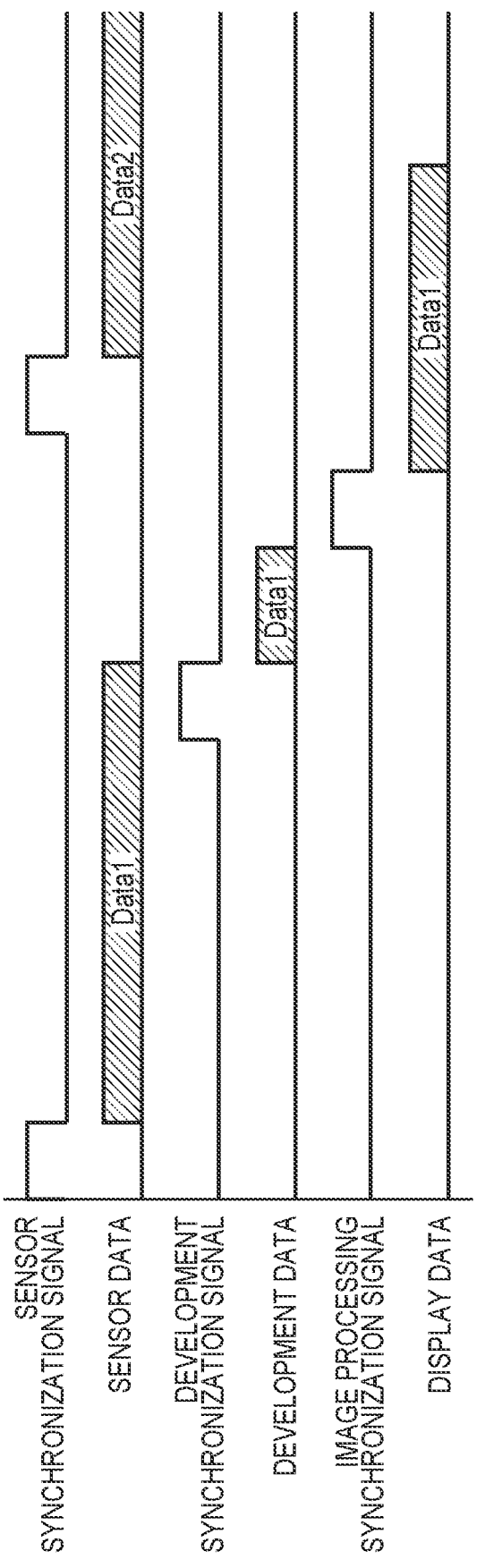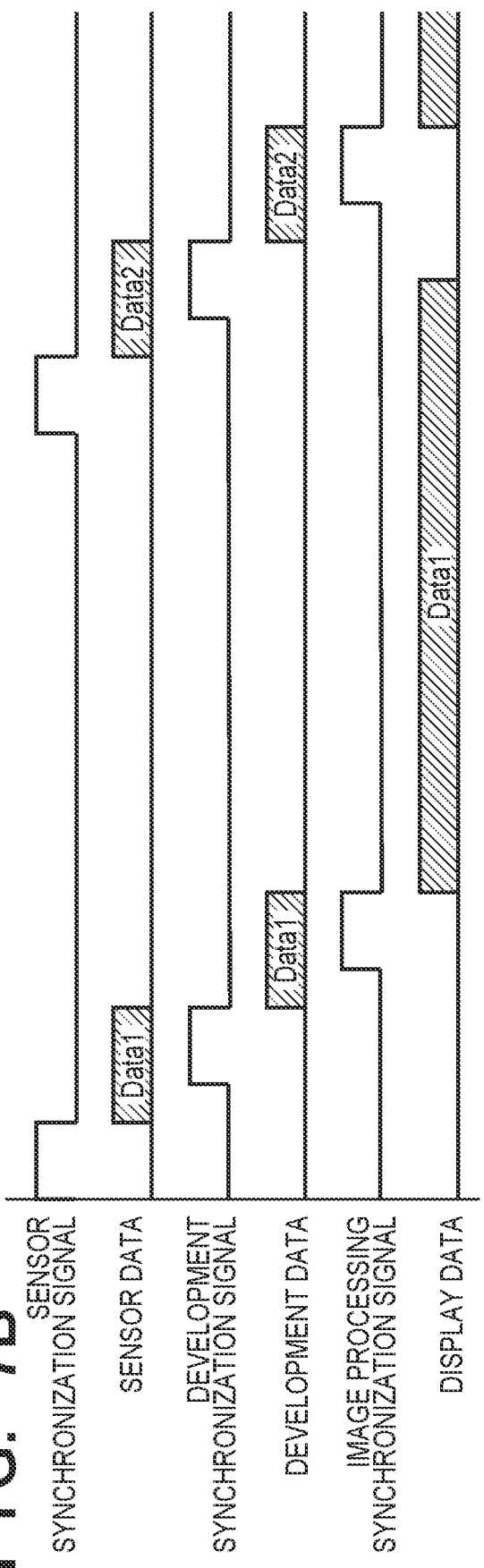

ELECTRONIC APPARATUS, METHOD FOR CONTROLLING SAME, AND COMPUTER READABLE MEDIUM

BACKGROUND OF THE INVENTION

Field of the Invention

The present invention relates to an electronic apparatus provided with a display unit, a method for controlling the same, and a computer-readable medium.

Description of the Related Art

Single-lens reflex cameras and mirrorless cameras are examples of a digital single-lens camera. Compared to single-lens reflex cameras, mirrorless cameras are compact and light-weight. In mirrorless cameras, the eyepiece finder is an electronic view finder (EVF) instead of an optical view finder (OVF). In mirrorless cameras, the EVF is required to be continuously run so that the subject can be checked when capturing an image. However, this is one reason why mirrorless cameras have a high power consumption compared to single-lens reflex cameras using an OVF and why less images can be captured with mirrorless cameras compared to single-lens reflex cameras.

A proposed solution to this problem is a method for reducing power consumption when the EVF is displaying an image by changing the transfer rate of image data transferred to the EVF depending on the operation state of a shutter button (see Japanese Patent Laid-Open No. 2007-019583). Another proposed solution is technology that reduces power consumption by decreasing the clock frequency for image processing (decreasing the frame rate) and decreasing the display brightness when an idle state has continued for a predetermined amount of time (see Japanese Patent Laid-Open No. 2007-096456).

However, with Japanese Patent Laid-Open No. 2007-019583, to keep a constant EVF display frame rate regardless of the transfer rate, at a low transfer rate, the resolution of the display image needs to be lowered, resulting in the visibility of the subject and additional information for operation being decreased. Also, in the Japanese Patent Laid-Open No. 2007-096456, the display frame rate is changed to keep the resolution of the display image constant. However, when the frame rate is changed, the EVF display is interrupted. To prevent such display interruption, the operation frequency needs to be changed using a plurality of clock oscillators for display processing. In other words, though the power consumption of the EVF is reduced and the visibility of the EVF is maintained, the configuration for display processing is made complex.

SUMMARY OF THE INVENTION

The present invention provides technology for changing a display rate while reducing the effect on display visibility.

According to one aspect of the present invention, there is provided an electronic apparatus provided with a display unit configured to display image data, comprising: one or more processors; and at least one memory coupled to the one or more processors, the at least one memory having instructions stored thereon which, when executed by the one or more processors, cause the electronic apparatus to function as: a synchronization control unit configured to generate a synchronization signal based on a display rate of the display unit; and an image processing unit configured to operate in accordance with an operating clock and execute image processing on image data to be displayed on the display unit at a display rate synchronized with the synchronization signal, wherein the operating clock is not changed when the synchronization control unit changes a period of the synchronization signal in accordance with a change in a display rate of the display unit.

According to another aspect of the present invention, there is provided a method for controlling an electronic apparatus, comprising: generating a synchronization signal based on a display rate of a display unit configured to display image data; and operating in accordance with an operating clock and executing image processing on image data to be displayed on the display unit at a display rate synchronized with the synchronization signal, wherein the operating clock is not changed when a period of the synchronization signal is changed in accordance with a change in a display rate of the display unit.

According to another aspect of the present invention, there is provided a non-transitory computer-readable storage medium storing a program for causing a computer to execute a method for controlling an electronic apparatus, wherein the method comprises: generating a synchronization signal based on a display rate of a display unit configured to display image data; and operating in accordance with an operating clock and executing image processing on image data to be displayed on the display unit at a display rate synchronized with the synchronization signal, wherein the operating clock is not changed when a period of the synchronization signal is changed in accordance with a change in a display rate of the display unit.

Further features of the present invention will become apparent from the following description of exemplary embodiments with reference to the attached drawings.

BRIEF DESCRIPTION OF TI-IE DRAWINGS

FIGS. 7A and 7B are timing charts of a synchronization signal and data transmission of an example with a reduced number of parallel processes according to the second embodiment.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be

First Embodiment

Figure 1:
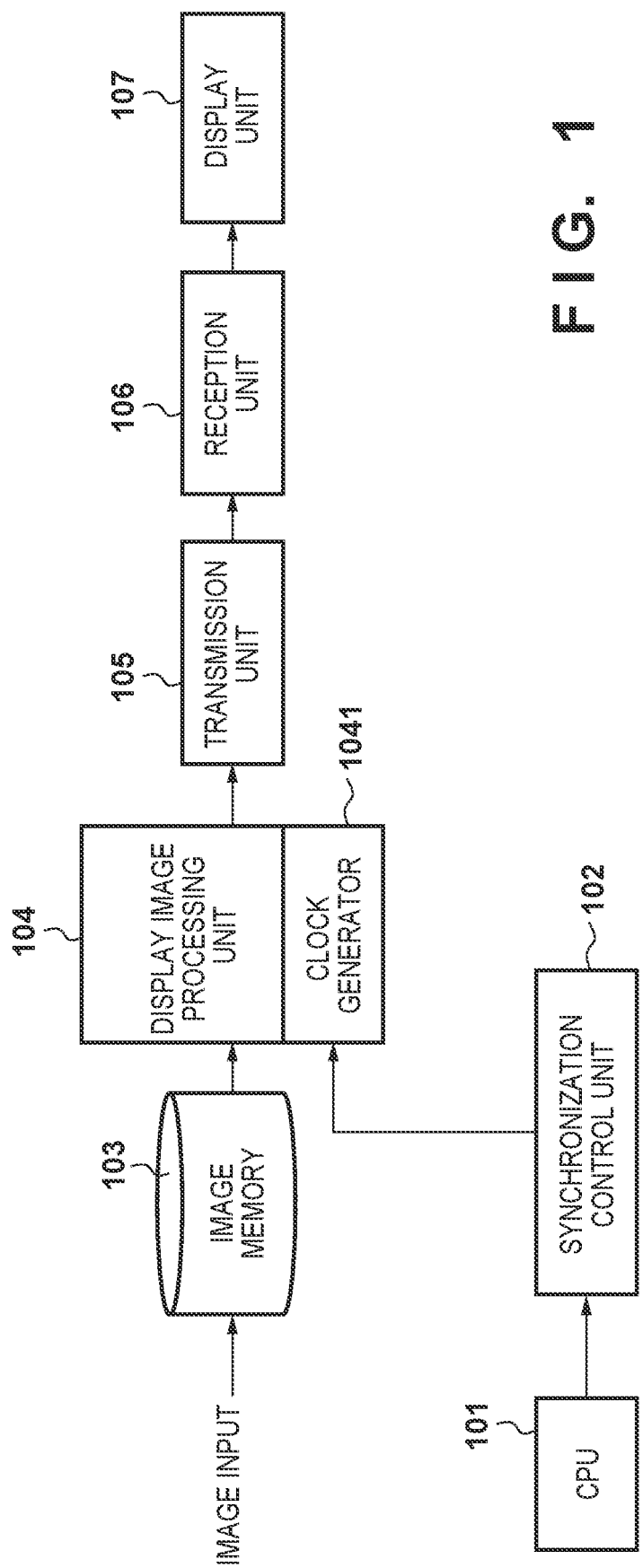
FIG. 1 is a block diagram illustrating an example configuration of a display system according to a first embodiment.

FIG. 1 is a block diagram illustrating an example configuration of a display system according to a first embodiment. The display system, for example, may be used as a part of an electronic apparatus provided with a display unit for displaying image data. Examples of such an electronic apparatus include a digital camera, a smartphone, a tablet, and the like. The images input into the display system are at first accumulated in an image memory 103. A CPU 101 implements various types of processing by executing a program stored in a non-illustrated memory. For example, the CPU 101 sends a synchronization signal change instruction to a synchronization control unit 102 depending on the display rate of a display unit 107. The synchronization control unit 102, in accordance with an instruction from the CPU 101, supplies a display image processing unit 104 with a synchronization signal based on the display rate of the display unit 107. The display unit 107 is capable of operating using a non-interlace system whereby an image is displayed one frame at a time at a predetermined frame rate or an interlace system by which a one frame image is divided in a plurality of fields and the image is displayed one field at a time at a predetermined frame rate. In the present specification, the term display rate includes in its meaning frame rate and field rate.

The display image processing unit 104 includes a clock generator 1041 that generates a clock (operating clock) for the operation of the display image processing unit 104. The clock is not affected by changes to the synchronization signal output by the synchronization control unit 102. Thus, the clock does not change when the synchronization signal changes. The display image processing unit 104 executes a predetermined image processing on image data using the clock generated by the clock generator 1041. Also, the display image processing unit 104, on the basis of the synchronization signal generated by the synchronization control unit 102, reads out the display image data from the image memory 103 and, after image processing is completed, sends the display image data to a transmission unit 105. In this way, the display image processing unit 104 operates in accordance with the operating clock, not using the synchronization signal, and executes image processing on the image data at a frame rate synchronized to the synchronization signal. The transmission unit 105 transmits the display image data to a reception unit 106. The reception unit 106 sends the display image data received from the transmission unit 105 to the display unit 107. The display unit 107 displays the received display image data at a display rate synchronized with the synchronization signal.

The transmission of frame data and field data will be described. The interlace system is a representative example of a transmission system using field data. The field data used in the interlace system contains data of only odd-numbered lines of the frame data (odd-numbered field) and data of only even-numbered lines of the frame data (even-membered field). When field data is transmitted, an image of the odd-numbered field and an image of the even-numbered field are alternately provided to the display unit 107. In the interlace system, when the pieces of field data are interlaced in a rime direction, the even-numbered lines and the odd-numbered lines are interlaced forming a single piece of frame data which is displayed. Thus, the amount of data transmitted for one piece of field data is half the amount of data transmitted for one piece of frame data. Or conversely, two pieces of field data can be transmitted for the same amount of data transmitted for one piece of frame data. Specifically, the amount of data transmitted for the data of 60 frames is the same as the amount of data transmitted for the data of 120 fields.

Above, the interlace system was given as a representative example of a system for transmitting field data. However, besides generating odd-numbered fields and even-numbered fields, various other systems for generating field data are known. In the present embodiment, the field data is only required to be data equaling half the amount of data of frame data, and the method for generating field data is not limited.

Figure 2A:
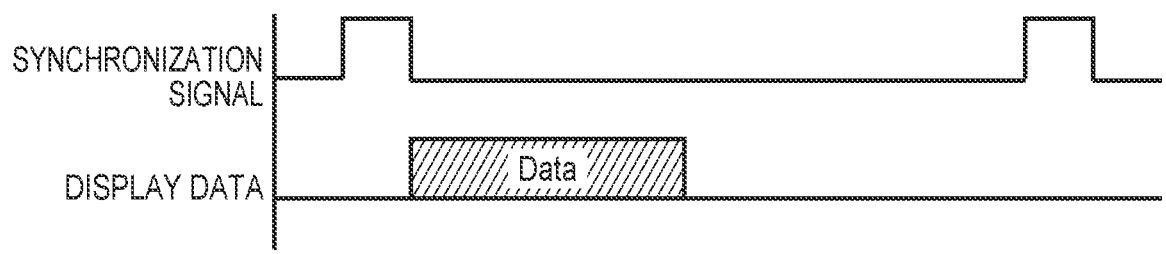
FIGS. 2A to 2C are timing charts of a synchronization signal and data transmission in the first embodiment.
Figure 2B:
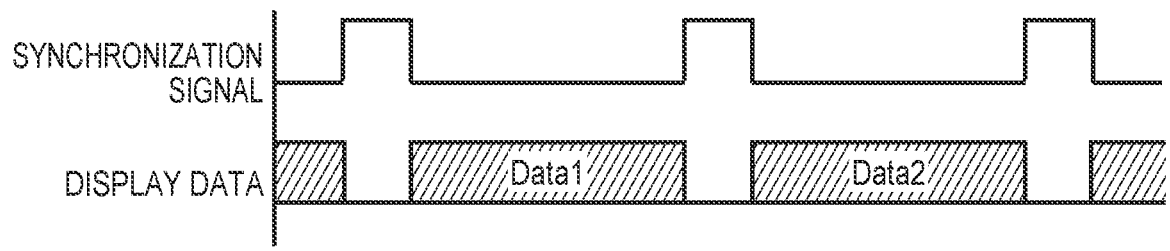
Figure 2C:
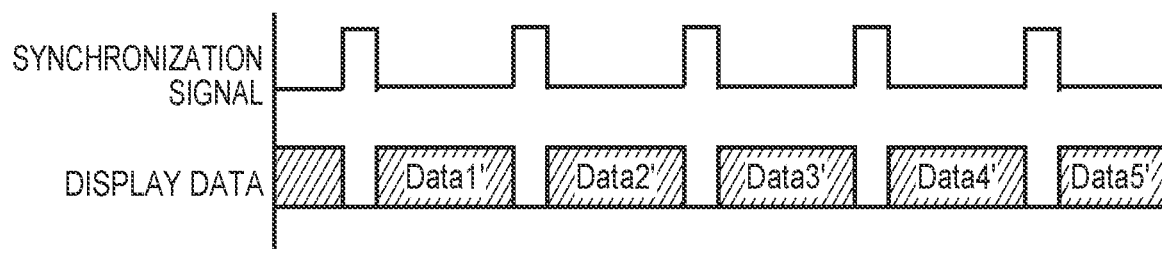

Next, the synchronization signal generated by the synchronization control unit 102 and the operation of each unit will be described. FIGS. 2A to 2C are timing charts illustrating the timing of the synchronization signal generated by the synchronization control unit 102 and supplied to the display image processing unit 104 and the timing of data transmission from the display image processing unit 104, through the transmission unit 105 and the reception unit 106, and to the display unit 107.

FIG. 2A is a timing chart of when display data of 30 frames per second is transmitted. The synchronization signal has 30 divisions per second, and display data of one frame is transmitted in the first half of one division. The second half of one division is surplus time. In other words, in the processing time of one frame set by the synchronization signal (one period), surplus time outside of operation time for the display image processing unit 104, the transmission unit 105, and the reception unit 106 is present. FIG. 2B is a timing chart of when display data of 60 frames per second is transmitted. The synchronization signal has 60 divisions per second, and display data of one frame is transmitted using the full amount of time of one division. FIG. 2C is a timing chart of when display data of 120 fields per second is transmitted. Note that, in the following description of the drawings, to distinguish between field data and frame data, an apostrophe is added to the end of field data text. The synchronization signal has 120 divisions per second, and display data of one field is transmitted in one division. Thus, as described above, the amount of data transmitted for 120 pieces of field data is the same as the amount of data transmitted for 60 pieces of frame data.

In FIGS. 2A, 2B, and 2C, the display image processing unit 104, the transmission unit 105, and the reception unit 106 all have the same data processing speed. Thus, the display image processing unit 104, the transmission unit 105, and the reception unit 106 are capable of executing processing at the same clock frequency, irrespective of the synchronization signal. Even when transitioning between the synchronization signals illustrated in FIGS. 2A to 2C, there is no need to change the clock frequency and no image interruption is caused. In other words, by changing the period of the synchronization signal depending on the display rate of the display unit 107, without changing the operating clock, image interruption can be prevented when changing the display rate of the display unit 107. Also, the display image processing unit 104, the transmission unit 105, and the reception unit 106 are restricted in operation to reduce power consumption when these units are not processing data. In other words, the operation of these units is restricted in the surplus time, outside of the time required for image processing, within the processing time (one period) of one frame set by the synchronization signal. In the present embodiment, for example, in FIG. 2A, the display image processing unit 104, the transmission unit 105, and the reception unit 106 are restricted in operation (for example, stopped) in the surplus time described above. In this way, without changing the clock frequency, the power consumption in the example illustrated in FIG. 2A is roughly half of the power consumption of the examples illustrated in FIGS. 2B and 2C.

Also, in FIG. 2C, the synchronization signal generated by the synchronization control unit 102 corresponds to a field rate with a frequency double that of the frame rate corresponding to the synchronization signal of FIG. 2B. For the display image processing unit 104, the amount of image data processed within the processing time (within one period) of one field with the field rate of FIG. 2C is half of the amount of image data processed within the processing time (within one period) of one frame with the frame rate of FIG. 2B. As a result, power consumption is reduced, with the power consumption of the example illustrated in FIG. 2C being roughly equal to the power consumption of the example illustrated in FIG. 2B. FIG. 2C illustrates an example in which the display image processing unit 104 changes the data amount of the image data provided to the display unit 107 within one period of the synchronization signal depending on the display rate of the display unit 107.

Note that by reducing the number of parallel processes of the display image processing unit 104, the transmission unit 105, and the reception unit 106, the processing time is increased. However, the power consumption can be reduced without changing the clock frequency. For example, the display image processing unit 104 may change the number of parallel processes for processing image data on the basis of a relationship between the period of the synchronization signal and the time required for image processing. For example, in the example of FIG. 2A, the display image processing unit 104 processes all of the image data in the first half of the time of one frame. However, the display image processing unit 104 may process the image data in the first half and the second half of the time of one frame. In this case, the amount of image data processed per unit time is halved (the number of parallel processes is halved).

As described above, according to the first embodiment, the power consumption of the display system can be reduced without the visibility of the display unit 107 being reduced and without using a plurality of clock generators for display processing.

Second Embodiment

Figure 3:
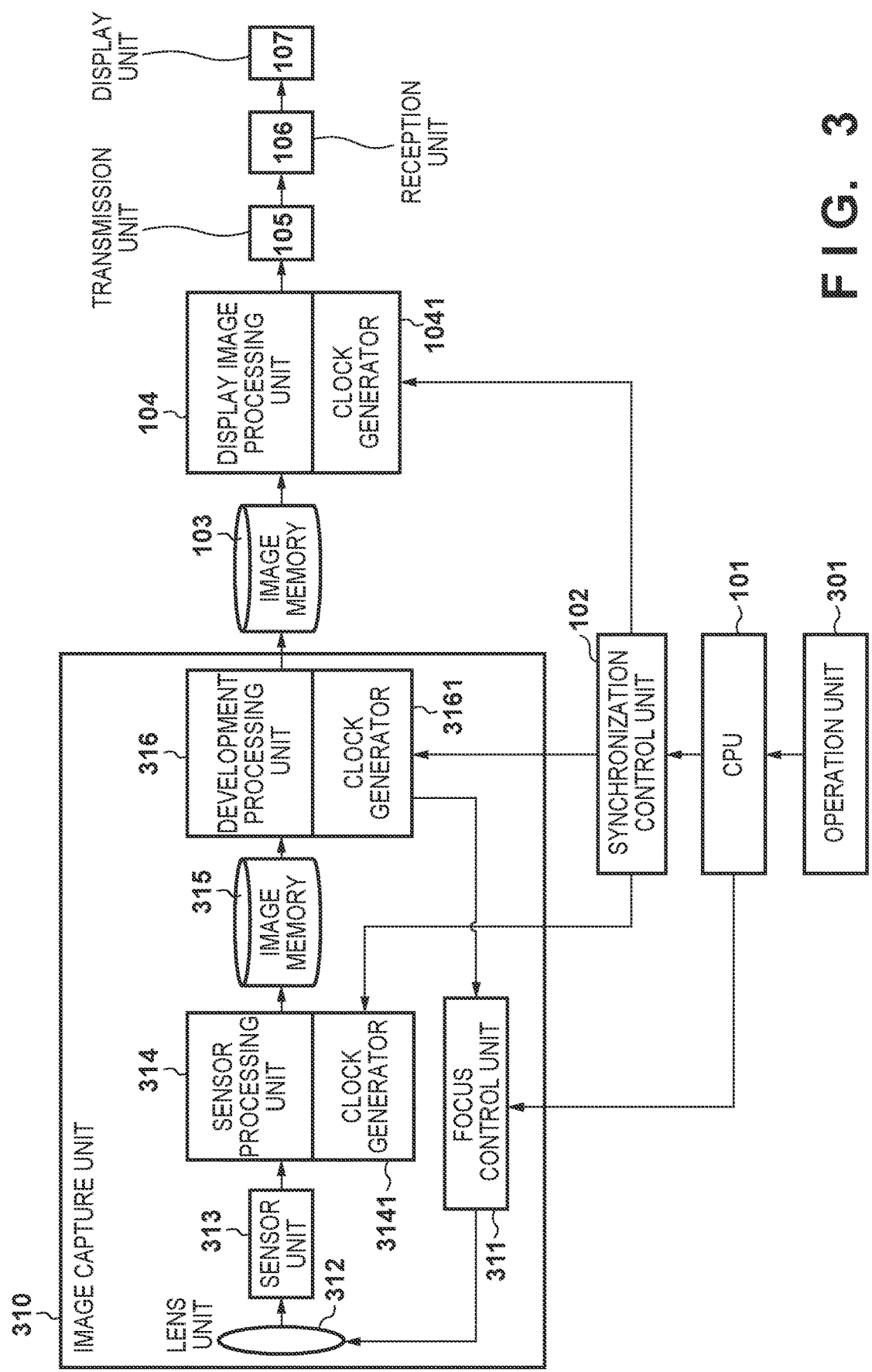
FIG. 3 is a block diagram illustrating an example configuration of a display system according to a second embodiment.

FIG. 3 is a block diagram illustrating an example configuration of a display system according to a second embodiment. The display system of an electronic apparatus including an image capture unit according to the second embodiment will be described.

In FIG. 3, components similar to those of the first embodiment are denoted with the same reference number. An operation unit 301 receives an instruction from a user and transmits the instruction contents to the CPU 101. The CPU 101 sends a synchronization signal change instruction to the synchronization control unit 102 in accordance with the user instruction received by the operation unit 301. Also, the CPU 101 sends a focus control instruction to a focus control unit 311 provided in an image capture unit 310 in accordance with a user instruction received from the operation unit 301. The synchronization control unit 102 supplies synchronization signals to the display image processing unit 104, a sensor processing unit 314, and a development processing unit 316. The synchronization signals supplied from the synchronization control unit 102 all have the same period. However, the phase is offset depending on the timing of the processing by the unit supplied with the synchronization signal.

The image capture unit 310 operates in accordance with the operating clock without being affected by changes to the synchronization signal supplied from the synchronization control unit 102, captures an image of a subject, and stores the obtained image in the image memory 103 as image data to be processed by the display image processing unit 104. The image capture unit 310 is provided with the focus control unit 311, a lens unit 312, a sensor unit 313, the sensor processing unit 314, an image memory 315, and the development processing unit 316. The focus control unit 311 controls the focus by driving the lens unit 312 in accordance with instructions from the CPU 101. The sensor unit 313 includes an image sensor and captures an image formed by the lens unit 312 under the control of the sensor processing unit 314.

The sensor processing unit 314 includes a clock generator 3141. The sensor processing unit 314 operates in accordance with the clock generated by the clock generator 3141 and reads out the image data from the sensor unit 313 in accordance with the synchronization signal supplied from the synchronization control unit 102. The sensor processing unit 314, after pixel defects inherent in the image sensor and the like are corrected for the image read out from the sensor unit 313, stores the corrected data in the image memory 315. In this way, the sensor processing unit 314 writes the image data obtained from the sensor unit 313 to the image memory 315 at a frame rate in accordance with the synchronization signal from the synchronization control unit 102.

The development processing unit 316 includes a clock generator 3161. The development processing unit 316 operates in accordance with the clock generated by the clock generator 3161, reads out the image data from the image memory 315 in accordance with the synchronization signal supplied from the synchronization control unit 102, and executes development processing. The development processing unit 316 stores the post-development image data in the image memory 103 and sends data for focus control to the focus control unit 311. In this way, the development processing unit 316 executes development processing on the image data read out from the image memory 315 at a frame rate in accordance with the synchronization signal from the synchronization control unit 102 and stores the post-development image data in the image memory 103. The display image processing unit 104, the transmission unit 105, the reception unit 106, and the display unit 107 are all as described in the first embodiment.

Figure 4:
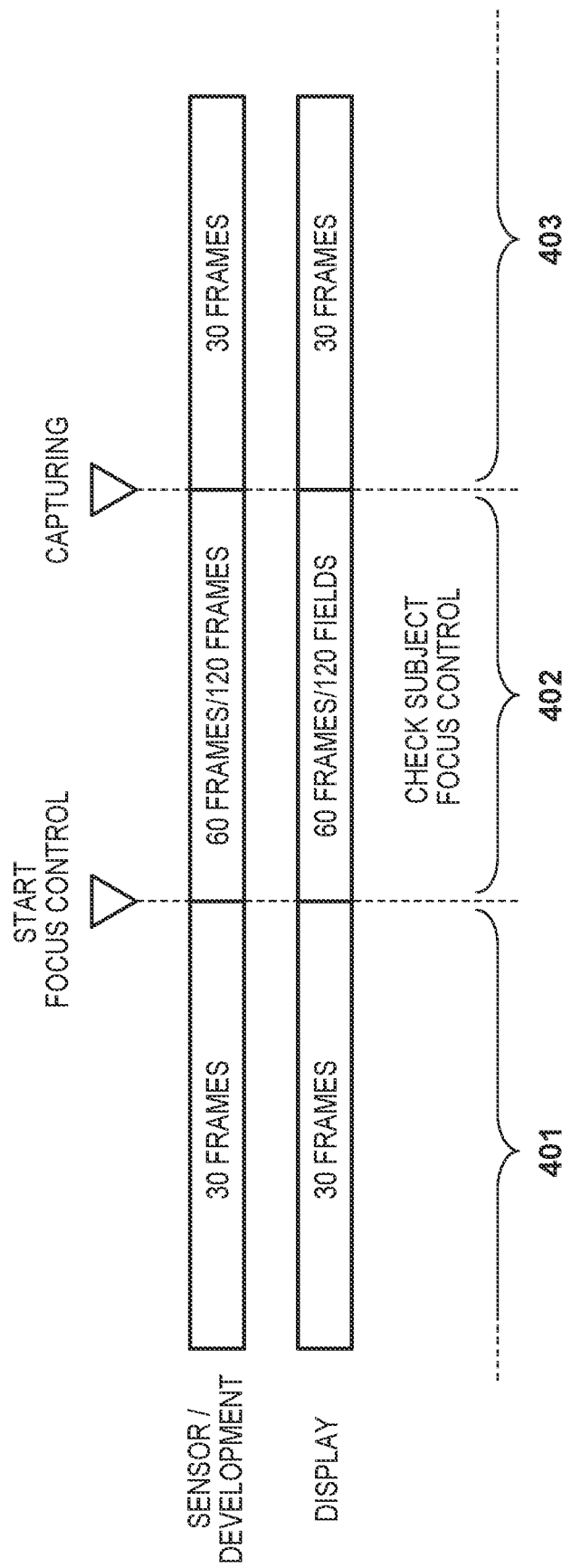
FIG. 4 is a timing chart for switching between synchronization signals in the second embodiment.

FIG. 4 is a timing chart illustrating the timing to change the synchronization signal via the synchronization control unit 102. The synchronization control unit 102 cooperates with the CPU 101 and controls the period of the synchronization signal in accordance with a user instruction. In normal operation (period 401), the entire system from the sensor unit 313 to the display unit 107 operates at 30 frames per second. When the operation unit 301 receives an instruction to focus (for example, a half press operation of the shutter switch) from a user, the CPU 101 notifies the synchronization control unit 102 of this. The synchronization control unit 102 that receives the instruction changes the synchronization signal (period 402) so that the processing from the sensor unit 313 acquiring an image to the development processing unit 316 writing image data to the image memory 103 is executed at 60 frames per second or 120 frames per second.

In the period 402, in the case in which the operation from the sensor unit 313 acquiring an image to the development processing unit 316 writing image data to the image memory 103 is executed at 60 frames per second, the operation from the display image processing unit 104 to the display unit 107 also changes to 60 frames per second. Also, in the period 402, in the case in which the operation from the sensor unit 313 acquiring an image to the development processing unit 316 writing image data to the image memory 103 is executed at 120 frames per second, the operation from the display image processing unit 104 to the display unit 107 also changes to 120 frames per second. Note that after image capture is completed, all processing returns to normal operation (30 frames per second) (period 403).

In this way, in the second embodiment, the period of the synchronization signal is controlled in accordance with a user instruction. For example, the synchronization signal is controlled in accordance with a user instruction such as an instruction relating to focus control of the image capture unit 310. In this case, the synchronization control unit 102 controls the synchronization signal so that the frequency (frame rate) when focus control is being executed is greater than the frequency (frame rate) during which focus control is not being executed.

Figure 5:
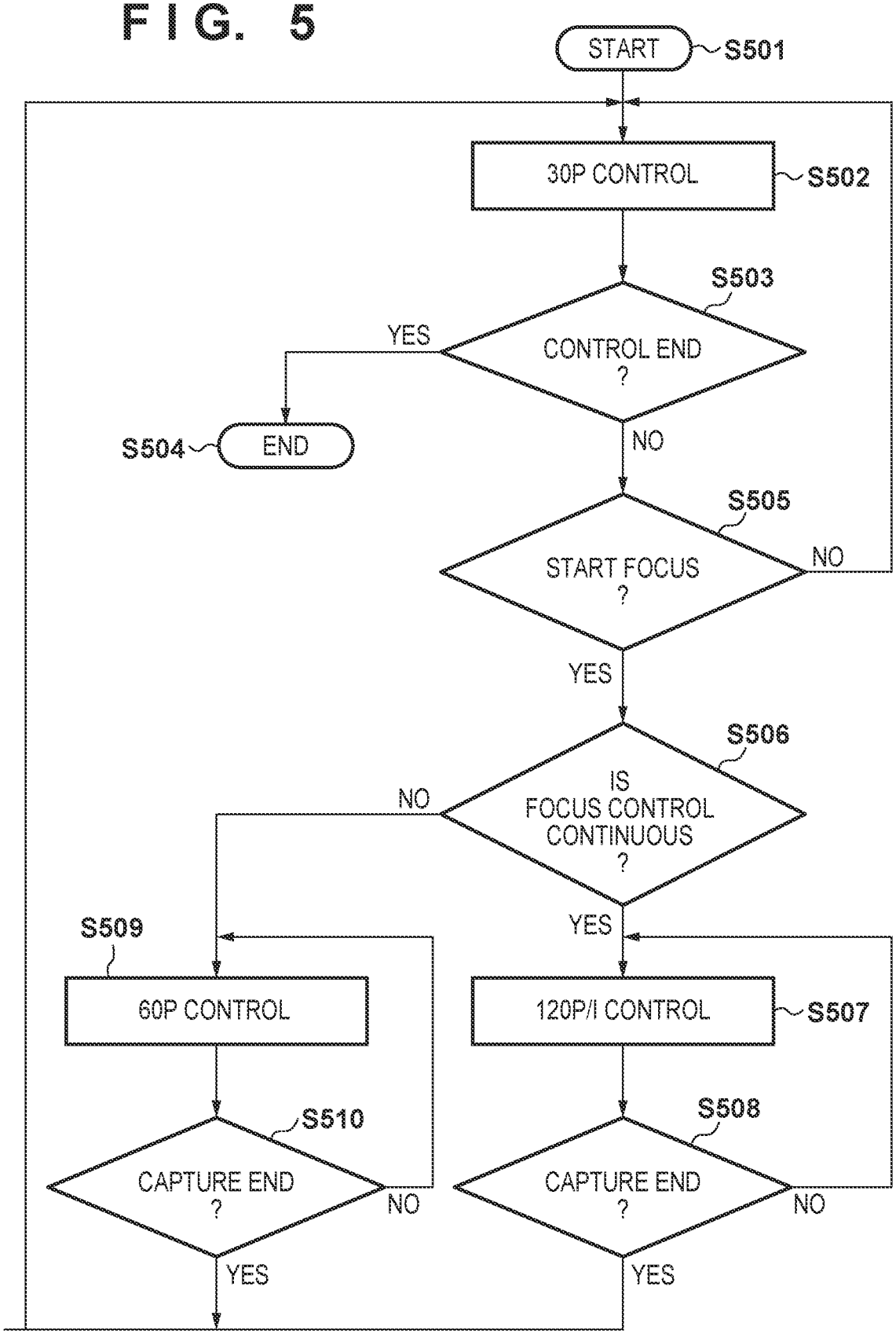
FIG. 5 is a flowchart for switching between synchronization signals in the second embodiment.

FIG. 5 is a flowchart illustrating the processing for changing the synchronization signal via the synchronization control unit 102. In step S501, control is started. In step S502, the synchronization control unit 102 outputs a synchronization signal for setting the operation from the image capture unit 310 to the display unit 107 to 30 frames per second (30 P control). In step S503, whether an instruction to end control has been received from the CPU 101 is determined. If an end control instruction has been received (YES in step S503), the process proceeds to step S504, and synchronization control ends. If an end control instruction has not been received, the process proceeds to step S505.

When the operation unit 301 receives a focus instruction from a user (for example, a half press of the shutter button), the CPU 101 outputs start focusing to the synchronization control unit 102. In step S505, the synchronization control unit 102 determines whether or not start focusing has been received from the CPU 101. If the start focusing is determined to have not been received (NO in step S505), the process returns to step S502. If the start focusing is determined to have been received (YES in step S505), the process proceeds to step S506. In step S506, the synchronization control unit 102 determines whether or not the focus control is continuous focusing control. The CPU 101 sends notification of whether or not the focus control is continuous focusing control. If it is determined to be continuous focusing control (YES in step S506), the process proceeds to step S507. If it is determined to not be continuous focusing control (NO in step S506), the process proceeds to step S509.

In step S507, the synchronization control unit 102 controls the synchronization signal so that the image capture unit 310 (from the sensor unit 313 to the development processing unit 316) operates at 120 frames per second (120 P control). Also, the synchronization control unit 102 controls the synchronization signal so that from the reading out of data from the image memory 103 to the display unit 107 operates at 120 fields per second (120 I control), In this way, the focus processing can be sped up and visibility of the subject to the user can be quickly improved. Note that the image data is written to the image memory 103 at 120 frames per second by the image capture unit 310 (development processing unit 316) and the image data is read out from the image memory 103 at 120 fields per second by the display image processing unit 104.

If it is determined to not be continuous focusing control in step S506 (NO in step S506), in step S509, the synchronization control unit 102 controls the synchronization signal so that the entire system from the sensor unit 313 to the display unit 107 operates at 60 frames per second (60 P control). In this way, compared to 30 frames per second (30 P control), the focus processing can be sped up and visibility of the subject to the user can be quickly improved. In step S508 and step S510, the synchronization control unit 102 determines whether or not image capture has been completed. If image capture has not been completed (if still in the process of image capturing), the processing of step S507 and step S509, respectively, are repeated. If image capture has been completed (YES in step S508 or YES in step S510), the process returns to step S502 and 30 P control is executed.

Note that in the example of FIG. 5 described above, changing the synchronization signal changing is related to focus control. However, exposure control or another control or a combination of conditions may be used as the condition to change the synchronization signal.

Figure 6A:
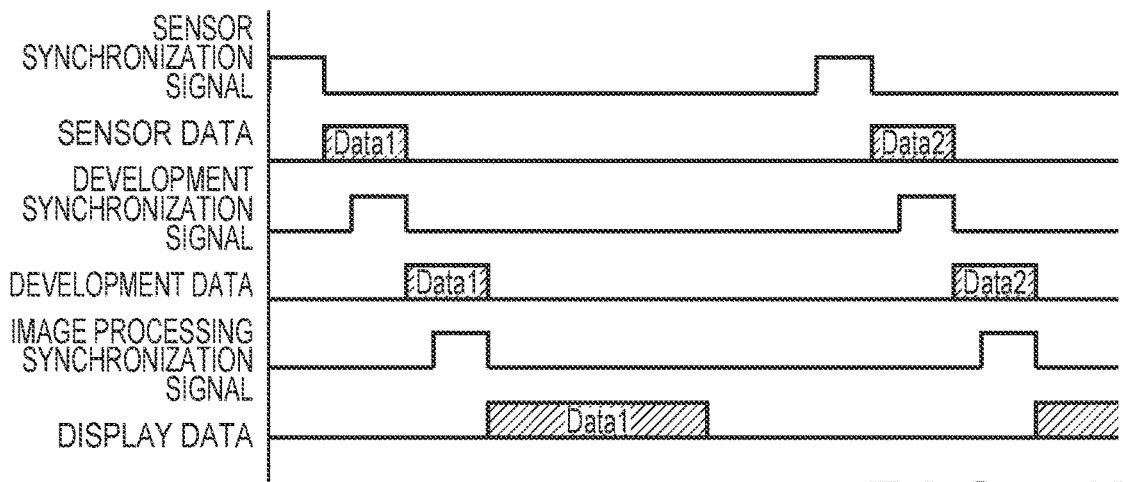
FIGS. 6A to 6C are timing charts of a synchronization signal and data transmission in the second embodiment.
Figure 6B:
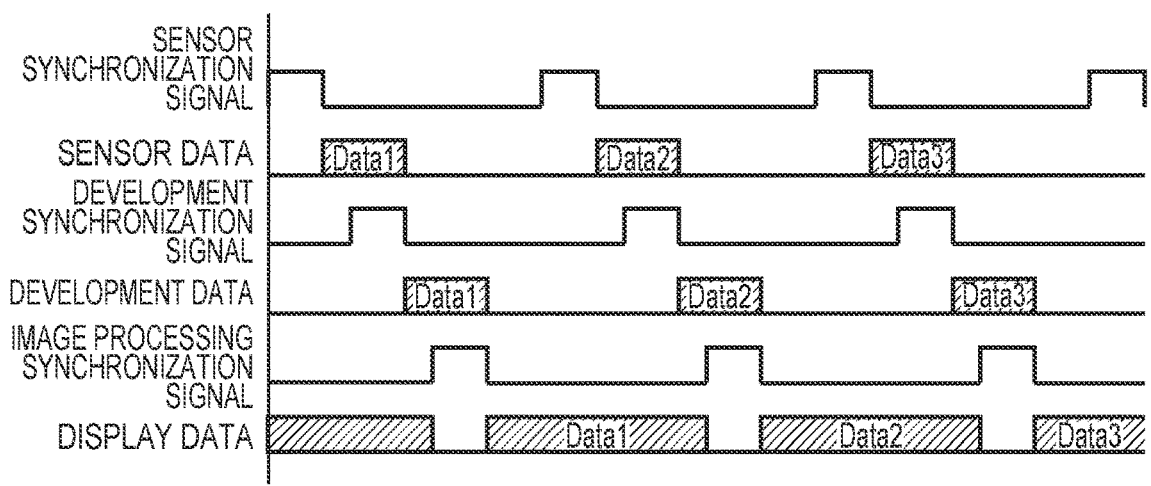
Figure 6C:
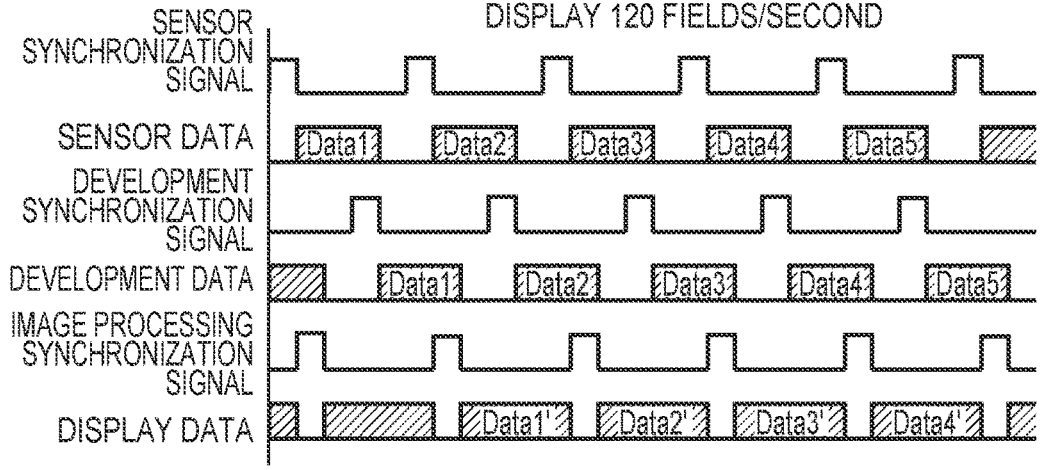

Next, the synchronization signal generated by the synchronization control unit 102 and the processing of each unit will be described. FIGS. 6A to 6C are timing charts illustrating the timing of the synchronization signals generated by the synchronization control unit 102 and supplied to the sensor processing unit 314, the development processing unit 316, and the display image processing unit 104 and the timing of data transmission of the entire operation from the sensor unit 313 to the display unit 107. Note that in FIGS. 6A to 6C, the synchronization signals supplied to the sensor processing unit 314, the development processing unit 316, and the display image processing unit 104 are labeled as the sensor synchronization signal, the development synchronization signal, and the image processing synchronization signal.

FIG. 6A is a timing chart of when display processing at 30 frames per second is executed. The processing from image data being read out from the sensor unit 313 through the sensor processing unit 314, the image memory 315, and the development processing unit 316, to writing image data to the image memory 103 operates at a high speed so that processing at 60 frames per second or processing at 120 frames per second can be executed. The processing of one frame from the image data being read out from the image memory 103, through the display image processing unit 104, the transmission unit 105, and the reception unit 106, to the display unit 107 displaying is executed in the first half of one division (the period of the synchronization signal of 30 frames per second).

FIG. 6B is a timing chart of when display processing at 60 frames per second is executed. The difference between FIG. 6A is that the periods of the synchronization signals are halved. Also, as described in the first embodiment, the processing of one frame from the display image processing unit 104 to the display unit 107 uses the full amount of time of one division (the period the synchronization signal of 60 frames per second).

FIG. 6C is a timing chart illustrating the timing of when the image capture unit 310 operates at 120 frames per second and the display processing from the display image processing unit 104 to the display unit 107 operates at 120 fields per second. The processing from image data being read out from the sensor unit 313, through the sensor processing unit 314, the image memory 315, and the development processing unit 316, to writing image data to the image memory 103 operates at 120 frames per second. As a result, the image data is written to the image memory 103 at 120 frames per second. Also, the display processing from the image data being read out from the image memory 103, through the display image processing unit 104, the transmission unit 105, and the reception unit 106, to the display unit 107 displaying operates at 120 fields per second. Note that in this case, the display image processing unit 104 alternately reads out odd-numbered field data and even-numbered field data from consecutive frames of the image data stored in the image memory 103. For example, Data U is constituted by the odd-numbered field of Data 1, and Data 2' is constituted by the even-numbered field of Data 2.

The sensor processing unit 314, the image memory 315, the development processing unit 316, the image memory 103, the display image processing unit 104, the transmission unit 105, and the reception unit 106 are restricted in operation (for example, stopped) to reduce power consumption when image data is not being processed or transmitted. Also, the processing of image data or the transmission of image data by the processing units are capable of operating at the same clock frequency irrespective of changes to the synchronization signal. Thus, it is not necessary to change the clock frequency of the clock generator 3141, the clock generator 3161, and the clock generator 1041 even when the operation transitions between the operations illustrated in FIGS. 6A, 6B, and 6C, meaning that no image interruption is caused. Also, by reducing the operation of at least one unit of the image capture unit 310 during the time (surplus time) when the image data is not being processed of the time of one frame set by the synchronization signal, the power consumption is reduced. For example, power consumption is reduced in order from the manner illustrated in FIG. 6A to FIG. 6B to FIG. 6C. Note that in FIG. 3, clocks used by the sensor processing unit 314, the development processing unit 316, and the display image processing unit 104 are generated separately. However, of these three processing units, two or more may operate using a common clock.

FIGS. 7A and 7B are timing charts illustrating the timing of the synchronization signal and the data transmission when the number of parallel processes has been reduced compared to the example of FIG. 6A. As described above, with the configuration illustrated in FIGS. 6A to 6C, the units of the image capture unit 310 (from the sensor unit 313 to the development processing unit 316) are sped up to operate at 120 frames per second and operation in the surplus time outside of processing time is restricted (for example, operations are stopped) to reduce power consumption. FIGS. 7A to 7B illustrate an example in which the number of parallel processes (the amount of data processed per unit time) is reduced to reduce power consumption.

FIG. 7A illustrates a method for reducing power consumption by reducing the number of transmission lines for when the image data is read out from the sensor unit 313 and stopping the operation of the reduced number of transmission lines. However, compared to FIG. 6A, the time for reading out from the sensor unit 313 is extended. This is due to the number of parallel processes being reduced. Reading out the image data from the image memory 315, development processing by the development processing unit 316, and writing the image data to the image memory 103 are all executed with a reduced number of parallel processes as in the method described above. This allows power consumption to be reduced. However, in FIG. 7A, the number of parallel processes of the development processing unit 316 is the normal number of parallel processes. The development processing unit 316 is between the image memory 315 and the image memory 103. Thus, in this manner, a processing unit with a reduced number of parallel processes and a processing unit with a non-reduced number of parallel processes can be used together. Thus, by changing the number of parallel processes of at least one unit of the image capture unit 310 for the time of one frame set by the synchronization signal, power consumption can be reduced without causing an interruption in processing.

FIG. 7B is a timing chart of an example in which the number of parallel processes for processing from reading out an image from the image memory 103 to the display unit 107 is reduced. In other words, power consumption is reduced by reducing the amount of data transferred to the display unit 107 per unit time. In this case, as in the embodiment described above, power consumption can be reduced without causing an interruption in the image.

As described above, in the second embodiment, with an electronic apparatus including the image capture unit 310, the visibility of the display by the display unit 107 can be maintained and the power consumption of the processing relating to display control can be reduced.

Third Embodiment

Figure 8:
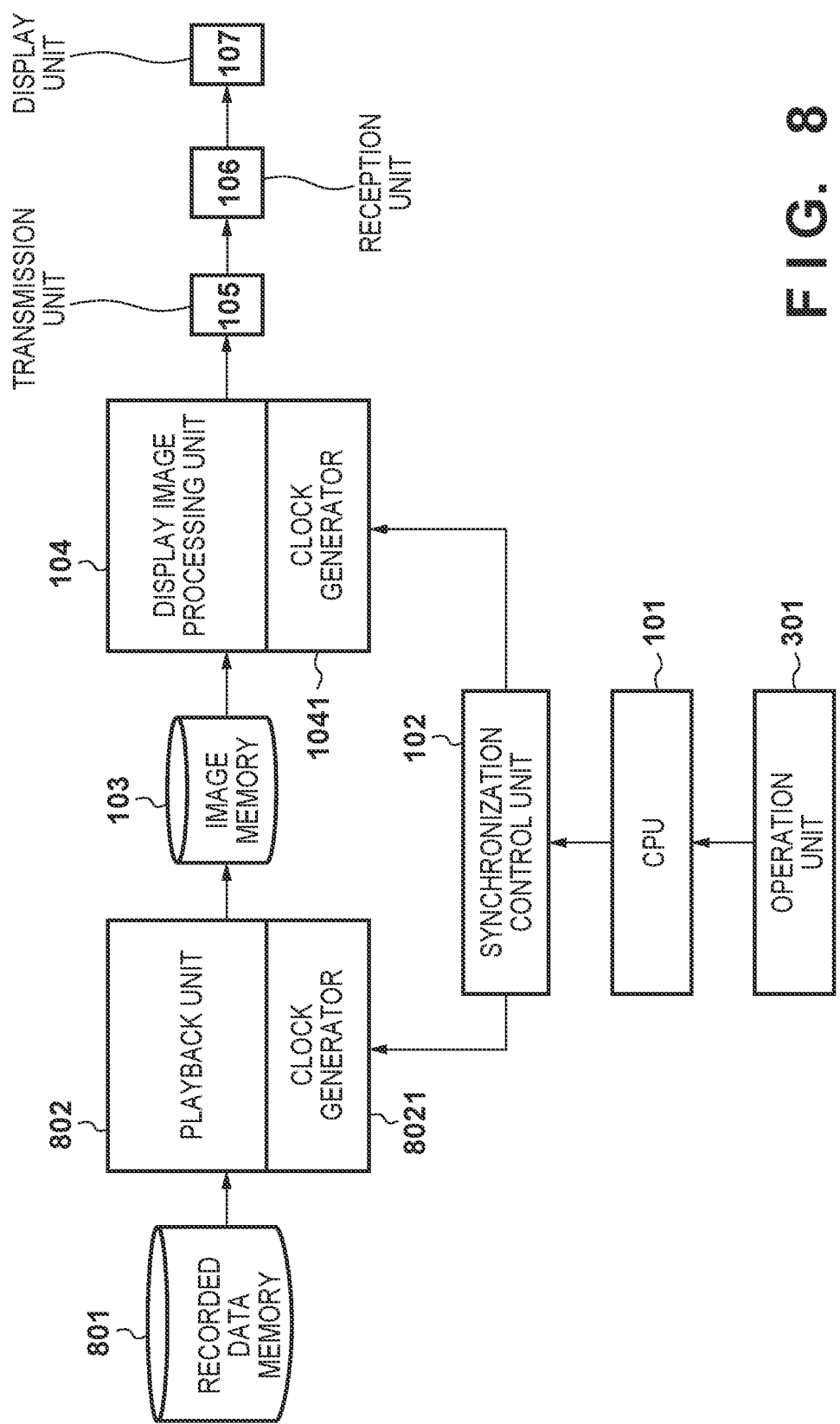
FIG. 8 is a block diagram illustrating an example configuration of a display system according to a third embodiment.

An electronic apparatus according to the second embodiment was described above. In the second embodiment, the electronic apparatus includes an image capture unit 310 configured to supply image data to the image memory 103. An electronic apparatus according to a third embodiment will be described. In the third embodiment, the electronic apparatus includes a playback unit for playback controlling the playback display of recorded image data on the display unit 107. FIG. 8 is a block diagram illustrating an example configuration of a display system according to the third embodiment. The display system of an electronic apparatus including a playback unit 802 according to the third embodiment will be described.

When the operation unit 301 receives an instruction from a user, the operation unit 301 transmits the instruction contents to the CPU 101. The CPU 101 sends a synchronization signal change instruction to the synchronization control unit 102 in accordance with the user instruction. The synchronization control unit 102 supplies synchronization signals to the units. Note that the synchronization signal supplied from the synchronization control unit 102 to the playback unit 802 and the synchronization signal supplied from the synchronization control unit 102 to the display image processing unit 104 have the same period, but have phases offset from one another. The playback unit 802 includes a clock generator 8021 and operates in accordance with an operating clock generated by the clock generator 8021, The operating clock generated by the clock generator 8021 is not affected by changes to the synchronization signal. The playback unit 802, in accordance with the synchronization signal generated by the synchronization control unit 102, reads out image data for playback from a recorded data memory 801, generates image data for each frame, and stores the image data in the image memory 103. The operation from the display image processing unit 104 to the display unit 107 is as described in the first embodiment and the second embodiment.

In the video data, various display rates are present, such as 30 frames per second, 60 frames per second, and 60 fields per second. By the playback unit 802 and from the display image processing unit 104 to the display unit 107 operating in accordance with the synchronization signal corresponding to the frame rate of the video data stored in the recorded data memory 801, image data of different frame rates can be appropriately displayed on the display unit 107. Also, in the case in which videos of different frame rates are present, power consumption can be reduced without an interruption in the video when transitioning between frame rates. Furthermore, in the case in which video data and still image data are both present, control can be executed to display the still image data at 30 frames per second, for example.

Note that in the embodiments described above, the phases of the synchronization signals supplied to the processing units are offset from one another. However, no such limitation is intended. Identical synchronization signals (synchronization signals with the same period and phase) may be supplied to the processing units, and the processing units may start processing after a delay from the synchronization signals as necessary. Also, the embodiments described above may be combined at discretion. For example, by combining the second embodiment and the third embodiment, an electronic apparatus including the image capture unit 310 and the playback unit 802 can be provided.

As described above, according to the embodiments described above, the display rate can be changed while reducing the effect on display visibility.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184078, filed Oct. 4, 2019 which is hereby incorporated by reference herein in its entirety.

What is claimed is:

1. An electronic apparatus provided with a display unit configured to display image data, comprising:
one or more processors; and
at least one memory coupled to the one or more processors, the at least one memory having instructions stored thereon which, when executed by the one or more processors, cause the electronic apparatus to function as:
a synchronization control unit configured to generate a synchronization signal based on a display rate of the display unit; and
an image processing unit configured to operate in accordance with an operating clock and execute image processing on image data to be displayed on the display unit at a display rate synchronized with the synchronization signal,
wherein
the operating clock is not changed when the synchronization control unit changes a period of the synchronization signal in accordance with a change in a display rate of the display unit,
the synchronization control unit generates a synchronization signal corresponding to a first display rate of the display unit and a synchronization signal corresponding to a second display rate which is double the first display rate; and
in the image processing unit, an amount of image data processed within one period at the second display rate is equal to half an amount of image data processed within one period at the first display rate.

2. The apparatus according to claim 1, wherein
the image processing unit changes a data amount of image data to be supplied to the display unit within one period of the synchronization signal in accordance with a display rate of the display unit.

3. The apparatus according to claim 1, wherein
the image processing unit restricts operation in a surplus time outside of time required for the image processing within one period of the synchronization signal.

4. The apparatus according to claim 1, wherein
in a case in which the image processing unit processes image data in accordance with a synchronization signal corresponding to the second display rate, the image processing unit alternately provides the display unit with a first field image and a second field image.

5. The apparatus according to claim 1, wherein
the image processing unit changes a number of parallel processes for processing image data on the basis of a relationship between a period of the synchronization signal and time required for the image processing.

6. The apparatus according to claim 1, further comprising
an image capture unit configured to operate in accordance with an operating clock, capture an image of a subject, and provide image data to the image processing unit;
wherein the image capture unit provides image data at a frame rate synchronized with another synchronization signal generated by the synchronization control unit that has an identical period to the synchronization signal.

7. The apparatus according to claim 6, wherein
the image capture unit includes
a sensor unit configured to execute image capture,
a sensor processing unit configured to process image data output from the sensor unit on the basis of a first other synchronization signal that has an identical period to the synchronization signal and an offset phase, and a development processing unit configured to execute development processing of image data processed by the sensor processing unit on the basis of a second other synchronization signal that has an identical period to the synchronization signal and an offset phase.

8. The apparatus according to claim 6, wherein
the synchronization control unit controls a period of the synchronization signal in accordance with a user instruction.

9. The apparatus according to claim 8, wherein
the user instruction includes an instruction relating to focus control of the image capture unit.

10. The apparatus according to claim 9, wherein
the synchronization control unit controls the synchronization signal so that a period of the synchronization signal when the focus control is being executed is less than a period of the synchronization signal when the focus control is not being executed.

11. The apparatus according to claim 8, wherein
the user instruction includes an instruction relating to reducing power consumption.

12. The apparatus according to claim 8, wherein
operation of at least one unit of the image capture unit is restricted during a time when image data is not being processed within time of one frame set by the synchronization signal.

13. The apparatus according to claim 8, wherein
for at least one unit of the image capture unit, a number of parallel processes in a time of one frame set by the synchronization signal is changed.

14. The apparatus according to claim 1, further comprising
a playback unit configured to operate in accordance with an operating clock, read out image data for playback from a memory, and provide the image data to the image processing unit;
wherein the playback unit provides image data for playback at a frame rate in accordance with another synchronization signal generated by the synchronization control unit that has an identical period to the synchronization signal.

15. The apparatus according to claim 14, wherein
the synchronization control unit controls a period of the synchronization signal on the basis of a frame rate for playback of image data for playback read out from the memory by the playback unit.

16. A method for controlling an electronic apparatus, comprising:
generating a synchronization signal based on a display rate of a display unit configured to display image data; and
operating in accordance with an operating clock and executing image processing on image data to be displayed on the display unit at a display rate synchronized with the synchronization signal,
wherein
the operating clock is not changed when a period of the synchronization signal is changed in accordance with a change in a display rate of the display unit,
in the generating, a synchronization signal corresponding to a first display rate of the display unit and a synchronization signal corresponding to a second display rate which is double the first display rate are generated; and
in executing the image processing, an amount of image data processed within one period at the second display rate is equal to half an amount of image data processed within one period at the first display rate.

17. A non-transitory computer-readable storage medium storing a program for causing a computer to execute a method for controlling an electronic apparatus, wherein the method comprises:
generating a synchronization signal based on a display rate of a display unit configured to display image data; and
operating in accordance with an operating clock and executing image processing on image data to be displayed on the display unit at a display rate synchronized with the synchronization signal,
wherein
the operating clock is not changed when a period of the synchronization signal is changed in accordance with a change in a display rate of the display unit,
in the generating, a synchronization signal corresponding to a first display rate of the display unit and a synchronization signal corresponding to a second display rate which is double the first display rate are generated; and
in executing the image processing, an amount of image data processed within one period at the second display rate is equal to half an amount of image data processed within one period at the first display rate.

* * * * *